(12) United States Patent
Murray

(10) Patent No.: US 9,058,194 B2
(45) Date of Patent: Jun. 16, 2015

(54) SOFTWARE APPLICATION PREVIEWS

(75) Inventor: Abraham Murray, Scituate, MA (US)

(73) Assignee: Google Inc., Mountain View, CA (US)

( * ) Notice: Subject to any disclaimer, the term of this patent is extended or adjusted under 35 U.S.C. 154(b) by 439 days.

(21) Appl. No.: 13/410,748

(22) Filed: Mar. 2, 2012

(65) Prior Publication Data

US 2013/0232485 A1 Sep. 5, 2013

(51) Int. Cl.
*G06F 9/455* (2006.01)
*G06F 9/44* (2006.01)
*G06F 9/445* (2006.01)

(52) U.S. Cl.
CPC .............. *G06F 9/45533* (2013.01); *G06F 8/61* (2013.01); *G06F 9/4445* (2013.01)

(58) Field of Classification Search
None
See application file for complete search history.

(56) References Cited

U.S. PATENT DOCUMENTS

| | | | | |
|---|---|---|---|---|
| 8,621,069 | B1 * | 12/2013 | Tompkins | 709/224 |
| 2005/0081218 | A1 * | 4/2005 | Acott et al. | 719/328 |
| 2006/0047665 | A1 * | 3/2006 | Neil | 707/10 |
| 2007/0256073 | A1 * | 11/2007 | Troung et al. | 718/1 |
| 2009/0300578 | A1 * | 12/2009 | Neil | 717/104 |
| 2010/0262958 | A1 | 10/2010 | Clinton et al. | |
| 2012/0149464 | A1 | 6/2012 | Bone et al. | |
| 2012/0151055 | A1 * | 6/2012 | Kansal et al. | 709/225 |
| 2012/0209586 | A1 * | 8/2012 | Mieritz et al. | 703/22 |
| 2012/0311564 | A1 * | 12/2012 | Khalid | 718/1 |

FOREIGN PATENT DOCUMENTS

WO 2012/082589 6/2012

OTHER PUBLICATIONS

Authorized Officer Martine Eich, International Search Report and Written Opinion for Application No. PCT/US2013/028613, dated May 7, 2013, 13 pages.
Sean Hollister: "Amazon.com lets you play with an Android virtual machine, try apps before you buy them", "engadget.com" Web site, Mar. 27, 2011, XP055060942, Retrieved from the Internet: URL:http://www.engadget.com/2011/03/27/amazon-com-lets-you-play-with-an-android-virtual-machine-try-ap/ [retrieved on Apr. 24, 2013].
Kincaid "Amazon's Android App Store Launches: Test Drive Apps Directly From Your Browser" [online] [retrieved on Mar. 27, 2011] Retrieved from the Internet: http://techcrunch.com/2011/03/22/amazon-android-app-store-3/?utm_source=feedburner& . . . (Mar. 22, 2011) pp. 1-3.

(Continued)

*Primary Examiner* — Kenneth Tang
(74) *Attorney, Agent, or Firm* — Fish & Richardson P.C.

(57) ABSTRACT

In one implementation, a computer-implemented method includes receiving, at a computer system and from a first computing device, a request to access a simulation of an application running a second computing device; identifying, by the computer system, one or more types of input that are available on the second computing device and that are not available on the first computing device; generating one or more controls for each of at least a portion of the identified types of input; instantiating, by the computer system, a virtual machine that simulates the second computing device; and providing information to the first computing device that causes i) an interface for the application as executed by the virtual machine to be presented by the first computing device and ii) the generated controls to be presented by the first computing device in association with the interface.

20 Claims, 8 Drawing Sheets

(56) References Cited

OTHER PUBLICATIONS

Slangen "Spoons Runs Windows Desktop Applications From Your Browser" [online] [retrieved on Jan. 26, 2011] Retrieved from the Internet: http://www.makeuseof.com/tag/spoon-runs-windows-desktop-applictions-browser/ 6 pages.

"Android Emulator" [online] [retrieved on Jan. 26, 2011] Retrieved from the Internet: http://deveioper.android.com/guide/developing/tools/emulator.html p. 1-25.

"VMware Virtualization and Cloud Management" *Solutions Overview* (2010) 4 pages.

"Citrix Cloud Solution for Compliance" *Solution Brief Citrix Cloud Solutions* (2010) 13 pages.

"Sevenval FIT Platform" [online] [retrieved on Jan. 19, 2011] Retrieved from the Internet: https://demo.sevenval.com/login 1 page.

"JuegosEnMovil FAQ: Games and mobile devices" [online] [retrieved on Jan. 19, 2011] Retrieved from the Internet: http://www.juegosenmovil.com/mobilegamesfaq.php pp. 1-3.

"Games and Software Emulator for Mobile Devices" [online] [retrieved on Jan. 19, 2011] Retrieved from the Internet: http://www.juegosenmovil.com/emulacion/emulator.php pp. 1-3.

"JuegosEnMovil: Software Development" [online] [retrieved on Jan. 19, 2011] Retrieved from the Internet: http://www.juegosenmovil.com/index_en.php pp. 1-2.

\* cited by examiner

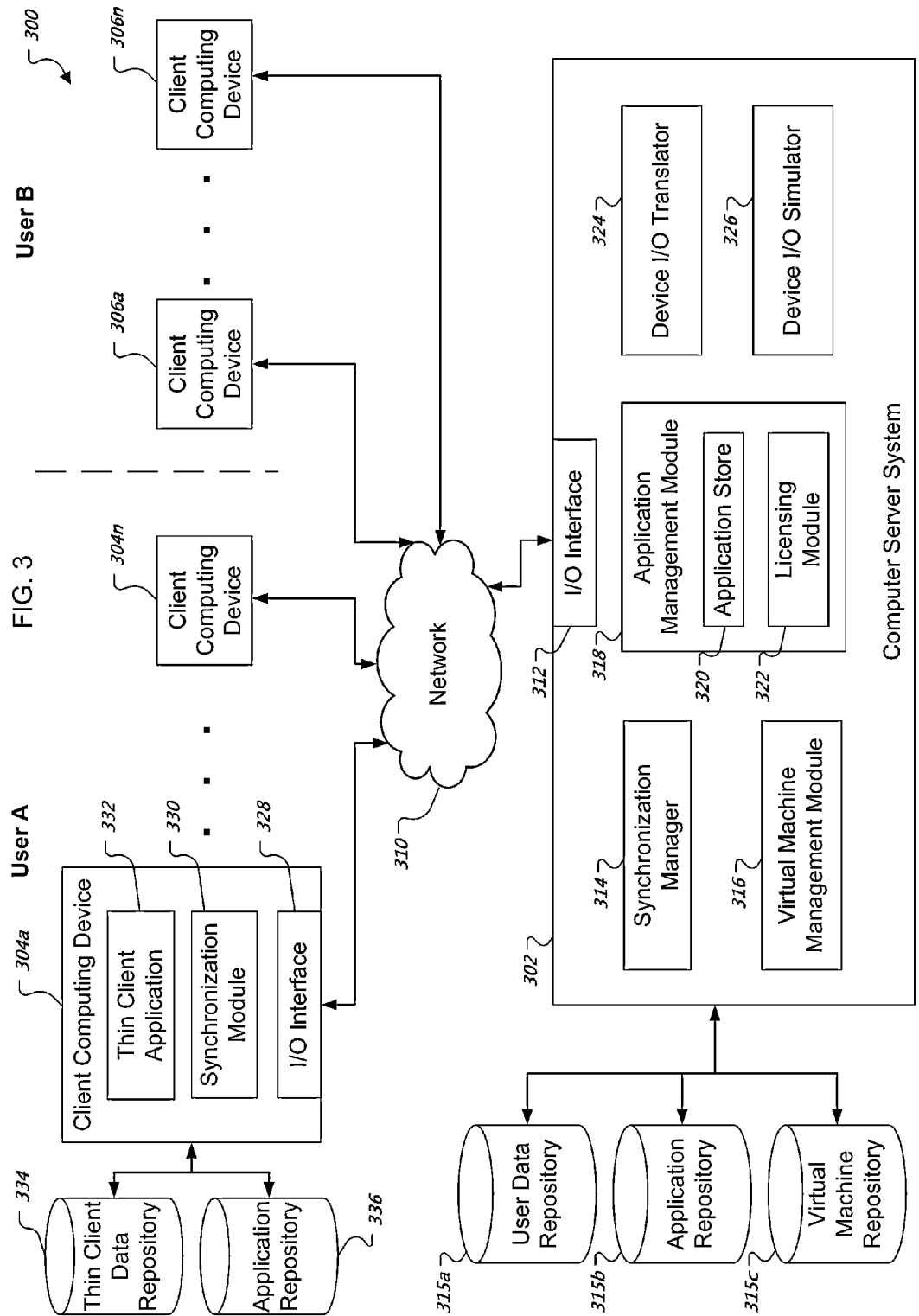

SOFTWARE APPLICATION PREVIEWS

TECHNICAL FIELD

This document relates to software application previews.

BACKGROUND

Software applications have been previewed on computing devices before being purchased in a variety of ways. For example, a preview version of a software application can be downloaded and installed on a computing device. Preview versions are software applications that provide limited operation to a user, such as allowing a user to access a limited set of the application's features and/or allowing a user to access the application for a limited period of time. Upon being purchased, a preview version of a software application can be converted into and/or replaced with a full version of the software application (e.g., an application providing full access to its features, an application without time or use restrictions).

SUMMARY

Software applications can be previewed on a computing device using a simulation of the computing device. For example, a user wants to preview an application that she is interested in possibly purchasing for her mobile computing device (e.g., smartphone). Instead of downloading and installing a preview version of the application on her mobile computing device, the user can preview the application running on a simulation of her mobile computing device. For instance, a computer system can instantiate a virtual machine that simulates the hardware (e.g., processor) and/or software (e.g., operating system) of the user's mobile computing device, as well as the user's settings on the mobile computing device (e.g., device configurations, installed applications, user data). The user can access the simulation running on the computer system over a network (e.g., local area network (LAN), Internet, 3G/4G wireless network) from any of a variety of computing devices, including the mobile computing device and/or other computing devices, such as a desktop computer. In another example, an emulator can be downloaded and run locally on a user's computing device to provide local access to simulations.

Users can also purchase applications and/or manage their purchased application using a computer system that is external to their computing devices. For example, a computer system (e.g., one or more computer servers) can maintain accounts for users that include information regarding applications that users own, computing devices that are associated with users, and/or various settings for the computing devices. Such a computer system can help maintain consistency across a user's multiple computing devices by synchronizing changes made on one of the user's computing devices to the user's other computing devices. For instance, if a user purchases an application for her tablet computing device, a computer system can store the application (or an identifier for the application) in association with the user's account and can make the application available on the user's other computing devices. An application can be made available on a user's other computing devices in a variety of ways, such as by providing the application and/or other versions of the application to the other computing devices (if the other computing devices are configured to run the application and/or other versions of the application), and/or providing access through a simulation of the computing device for which the application was purchased.

In one implementation, a computer-implemented method includes receiving, at a computer system and from a first computing device, a request to access on the first computing device a simulation of an application running a second computing device; identifying, by the computer system, one or more types of input that are available on the second computing device and that are not available on the first computing device; generating one or more controls for each of at least a portion of the identified types of input, wherein each of the generated controls is configured to simulate one or more of the identified types of input on the first computing device by mapping input from the first computing device to the one or more of the identified types of input that are available on the second computing device; instantiating, by the computer system, a virtual machine that simulates the second computing device and initiating execution of the application using the instantiated virtual machine, wherein the virtual machine is configured to provide input received through the generated controls to the application as input of the one or more identified types of input that are available on the second computing device; and providing information to the first computing device that causes i) an interface for the application as executed by the virtual machine to be presented by the first computing device and ii) the generated controls to be presented by the first computing device in association with the interface.

In another implementation, a computer program product tangibly embodied on a non-transitory computer readable medium storing instructions that, when executed, cause a computer system to perform operations that include receiving, from a first computing device, a request to access a simulation of an application running on a second computing device; identifying one or more types of input that are available on the second computing device and that are not available on the first computing device; generating one or more controls for each of at least a portion of the identified types of input, wherein each of the generated controls is configured to simulate one or more of the identified types of input on the first computing device by mapping input from the first computing device to the one or more of the identified types of input that are available on the second computing device; instantiating a virtual machine that simulates the second computing device and initiating execution of the application using the instantiated virtual machine, wherein the virtual machine is configured to provide input received through the generated controls to the application as input of the one or more identified types of input that are available on the second computing device; and providing information to the first computing device that causes i) an interface for the application as executed by the virtual machine to be presented by the first computing device and ii) the generated controls to be presented by the first computing device in association with the interface.

In another implementation, a system includes one or more computers; an interface of the one or more computers to receive, from a first computing device, a request to access a simulation of an application running on a second computing device; a device input/output (I/O) simulator of the one or more computers i) to identify one or more types of input that are available on the second computing device and that are not available on the first computing device, and ii) to generate one or more controls for each of at least a portion of the identified types of input, wherein each of the generated controls is configured to simulate one or more of the identified types of input on the first computing device by mapping input from the first computing device to the one or more of the identified types of input that are available on the second computing device; and a virtual machine management module to instantiate a virtual machine that simulates the second computing device and to initiate execution of the application using the instantiated virtual machine, wherein the virtual machine is configured to provide input received through the generated controls to the application as input of the one or more identified types of input that are available on the second computing device; wherein the interface is further configured to provide information to the first computing device that causes i) an interface for the application as executed by the virtual machine to be presented by the first computing device and ii) the generated controls to be presented by the first computing device in association with the interface.

The details of one or more embodiments are set forth in the accompanying drawings and the description below. Various advantages can be provided by the disclosed systems and methods. For example, users can receive an accurate preview of how an application will run on one or more of their computing devices without having to download and install a preview version of the application. Additionally, since the preview of the application can be provided remotely by a computer system, access to a preview of the application can be more readily controlled so as to prevent possible abuse, like user circumvention of features to prevent full access to an application while it is being previewed.

In another example, users can obtain device independence for their applications. Given the increase in the number of computing devices that a user may concurrently own and use (e.g., smartphones, laptop computers, desktop computers), it can be difficult for a user to maintain consistency among the applications that are installed on each device. Additionally, having to go through the trouble of re-installing and configuring all of their applications on a new device can sometimes be a barrier for a user to move to a new device. By maintaining a repository of applications and settings (e.g., operating system settings, application settings), a user can more easily maintain consistency across her devices and move from one device to another—application offerings and settings can be automatically synchronized across a user's computing devices.

Other features, objects, and advantages will be apparent from the description and drawings, and from the claims.

BRIEF DESCRIPTION OF DRAWINGS

FIG. 3 depicts an example system for providing application previews and/or device synchronization using a computer server system.

Like reference symbols in the various drawings indicate like elements.

DETAILED DESCRIPTION

This document generally describes providing previews of software applications using simulations of users' computing devices. For example, a user that is using a laptop computer to browse through an electronic application store (e.g., a website offering applications for sale) can preview one or more of the applications, as they would be run on a smartphone while using the laptop computer. The electronic application store can instantiate a virtual machine that simulates the user's smartphone, with the user's settings (e.g., device and/or application settings on the user's smartphone), and can provide previews of applications offered in the application store to the user's laptop computer. The laptop computer can access such previews using any of a variety of thin client applications (e.g., CITRIX client application) that display the application running on a virtual machine at a computer server system and that relay user inputs back to the computer server system for interaction with the application. Thin client applications are applications that rely on another computing device to perform the majority of the computational tasks for a particular application.

This document also describes application purchasing and/or managing using computer server systems in a device-independent manner. Computer server systems, such as a cloud-based computer server system (e.g., a distributed computer server system providing machine-independent storage and processing), can store applications (and/or application identifiers) in association with user accounts and can allow for devices associated with the user accounts to be synchronized. For example, an application purchased in association with a user account for a smartphone can be stored by a computer server system and subsequently provided to other computing devices associated with the account, such as a laptop computer and a tablet computing device.

Devices that are not compatible with a particular application, such as a computing device that uses a different operating system than an operating system for which the particular application is designed, can be provided with thin clients (or configuration information for thin clients) to permit such devices to provide access to the particular application through communication with computer server systems running the particular application. Computer server systems can also be used to store and synchronize various settings across devices in association with user accounts, such as device settings (e.g., desktop configuration) and/or application settings (e.g., configuration of a particular application). Such computer server systems can persistently store information associated with a user account, so as to allow a user to change computing devices yet automatically maintain a global device configuration across devices.

Figure 1:
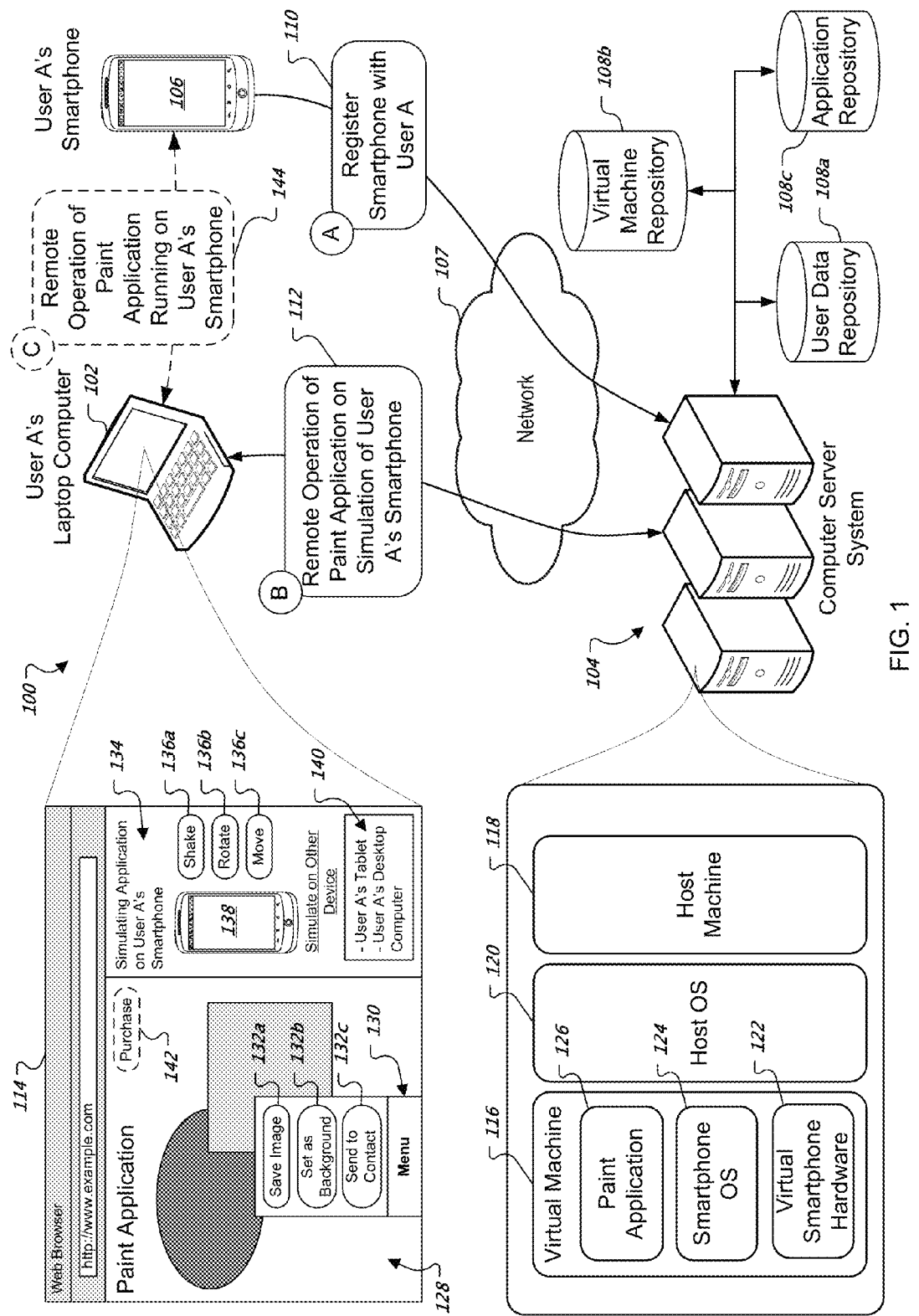
FIG. 1 is a diagram of an example system for providing an application preview on a laptop computer using a computer server system that is running the application with a simulation of a smartphone

FIG. 1 is a diagram of an example system 100 for providing an application preview on a laptop computer 102 using a computer server system 104 that is running the application with a simulation of a smartphone 106. As depicted, the laptop computer 102 and the smartphone 106 are presented as example computing devices associated with User A. Any of a variety of other computing devices can be associated with User A and used interchangeably with the laptop computer 102 and/or the smartphone 106, such as a tablet computing device, a desktop computer, a netbook, and/or a personal digital assistant (PDA).

The computer server system 104 can include one or more computer servers that perform various tasks. For example, the computer server system 104 can be a distributed collection of computer servers that provide a "cloud" computing environment to the laptop computer 102 and/or the smartphone 106 over one or more networks 107 (e.g., Internet, 3G/4G network, wireless network, LAN, wide area network (WAN), virtual private network (VPN), or any combination thereof). As explained above, a cloud computing environment is a distributed computing environment in which data and/or processes are machine and/or location independent.

The computer server system 104 can use various repositories and/or databases, such as example repositories 108a-c, to provide application previews. For instance, the user data repository 108a stores information associated with user accounts, such as information identifying devices, applications, and/or settings that are associated with a user's account. The virtual machine repository 108b can store various executable and configuration files for running virtual machines to simulate various computing devices, such as the smartphone 106 and/or the laptop computer 102. The application repository 108c can store a variety of applications, such as applications that may have been purchased in association with one or more user accounts and/or applications that have not yet been purchased and are available to be previewed by users.

Before providing simulation of the smartphone 106 by the computer server system 104 to the laptop computer 102, the User A may have registered the smartphone 106 as being associated with a user account for User A (110), as indicated by action box A. For instance, the User A can register the smartphone 106 with the user account for User A in a variety of ways, such as logging into the computer server system 104 using the smartphone 106, entering a unique registration code into the smartphone 106, and/or providing a unique identifier for the smartphone to the computer server system 104.

As part of the device registration (110), the computer server system 104 can update the corresponding repositories 108a-c. For example, data associated with User A's account can be added/updated to indicate that the smartphone 106 is associated with User A. Additionally, data can be added/updated to the user data repository 108a to indicate various settings on the smartphone 106, such as the applications that are installed on the smartphone 106, data that is used on the smartphone 106 (e.g., list of contacts, websites designated as favorites), and/or device configurations for the smartphone 106 (e.g., ringer settings, desktop icon configuration). Information that can be used to instantiate a virtual machine of the smartphone 106 can be designated in the virtual machine repository 108b, such as information indicating various hardware components (e.g., processor, random access memory (RAM), input/output (I/O) devices) and/or software components (e.g., operating system, libraries, drivers) of the smartphone 106. Components of the smartphone 106 that are not already present in the virtual machine repository 108b, such as a particular version of a library used by the smartphone 106, can be obtained by the computer server system 104 and added to the virtual machine repository 108b. Additionally, applications that are installed on the smartphone 106 can be added to the application repository 108c in association with the user account. For example, if the User A has installed a game on the smartphone 106, the game can be provided to the computer server system 104 by the smartphone 106 and stored in the application repository 108c. In another example, if the if the User A has installed a game on the smartphone 106, if a corresponding version of the game is identified in the application repository 108c, an identifier for the game can be associated with the user account for the User A (instead of uploading and storing a redundant copy of the game in the application repository 108c).

In the depicted example, the laptop computer 102 can contact the computer server system 104 to access a paint application that is simulated on the smartphone 106, as indicated by action box B (112). For example, the laptop computer 102 can use a web browser 114 (e.g., GOOGLE CHROME, INTERNET EXPLORER, MOZILLA FIREFOX, SAFARI) to send a request to the computer server system 104 to obtain access to the paint application. Such a request can include information identifying the laptop computer 102 as being associated with User A, such as login information for User A and/or information uniquely identifying the laptop computer 102 with the computer server system 104 (e.g., a unique identifier for the laptop computer 102 that is stored in a cookie associated with the computer server system 104).

In response to receiving the request from the laptop computer 102 to access the paint application as run on a simulation of the smartphone 106, the computer server system 104 can retrieve information associated with the user account for User A and/or the smartphone 106 from the repositories 108a-c. For example, the computer server system 104 can retrieve setting information for User A's account from the user data repository 108a, information to instantiate a virtual machine to emulate the smartphone 106 from the virtual machine repository 108b, and/or information identifying various other applications owned by User A from the application repository 108c.

The computer server system 104 can use this retrieved information to instantiate a virtual machine 116 for the smartphone 106 on one or more host machines 118 of the computer server system 104. Generally speaking, the host machine 118 is one or more data processing apparatus such as a rack mounted server or other computing device. The data processing apparatus can include data devices in different physical locations, which can have different capabilities and computer architectures. The devices of the host machine 118 can communicate with each other through an internal data communications network that can include one or more wired (e.g., Ethernet) and/or wireless (e.g., WI-FI) networks. The host machine 118 can also communicate with devices on external networks, such as the Internet, through one or more gateways responsible for routing data communication traffic between the internal network and the external network. Other types of external networks are possible.

The host machine 118 executes a host operating system 120 or other software that virtualizes the underlying host machine hardware and manages concurrent execution of one or more virtual machines. For example, the host operating system 120 is managing virtual machine 116. The virtual machine 116 includes a simulated version of the underlying hardware of the smartphone 106. The simulated version of the hardware is referred to as virtual hardware 122. Software that is executed by the virtual hardware 122 is referred to as guest software. In some implementations, guest software cannot determine if it is being executed by virtual hardware or by the physical host machine 118. If guest software executing in a virtual machine, or the virtual machine itself, malfunctions or aborts, other virtual machines executing on the host machine 118 will not be affected. The host machine's 118 microprocessor(s) can include processor-level mechanisms to enable virtual hardware to execute software applications efficiently by allowing guest software instructions to be executed directly on the host machine's 118 microprocessor without requiring code-rewriting, recompilation, or instruction emulation.

The virtual machine's 116 guest software can include a guest operating system, which in the depicted example is an operating system (OS) 124 of the smartphone 106. The smartphone OS 124 is software that controls the execution of respective guest software applications, such as a paint application 126 requested by the laptop 102, within the virtual machine 116 and that provides services to those applications. For example, a guest operating system can be a mobile device operating system, such as ANDROID, BLACKBERRY OS, WINDOWS MOBILE, and/or APPLE IOS. Other operating systems are possible. The virtual machine 116 can be instantiated using various settings for the user account of User A, as retrieved from the repositories 108a-c. For example, the smartphone OS 124 can be launched by the virtual smartphone hardware 122 using device configuration information associated with User A's account, such as information designating a background image for the desktop and/or setting menus with links to other applications. For instance, the menus can be generated such that the user can launch, run, and interact with any applications on the virtual machine 116 that are available on the smartphone 106.

With the virtual machine 116 instantiated and the requested paint application 126 running, the computer server system 104 can provide the laptop computer 102 with access to the paint application 126 as simulated on the smartphone 106. Such access can be provided by a thin client application on the laptop computer 102 that receives display information from the virtual machine 116 and provides information indicating user input to the virtual machine 116. An example user interface for such access to the paint application is depicted in web browser 114. The paint application is running on the simulation of the smartphone 106 is depicted in frame 128, which includes a menu 130 for the smartphone 106 being displayed.

The preview of the paint application on the laptop computer 102 through a simulation of the smartphone 106 can be provided as fully operational application preview that is capable of interacting with the User A's settings and/or other applications. For example, interacting with entries 132a-c of the menu 130 can cause the virtual machine 116 to perform operations as though the paint application were installed on the smartphone 106. For instance, if the user selects the "send to contact" menu entry 132c, then the displayed image (oval and rectangle) can be sent to one or more selected contacts from the User A's contacts on the smartphone 106. In another example, if the user selects the "set as background" menu entry 132b, then the displayed image (oval and rectangle) can be set as the background image on one or more devices associated with User A's account, such as the laptop computer 102 and/or the smartphone 106. In a further example, if the user selects the "send to contact" menu entry 132c, then an application on the smartphone 106 may launch another application, such as a text messaging application, with which the user can select one or more contacts and send the display image (oval and rectangle).

The depicted example also includes a frame 134 that provides the user with additional information associated with the simulation in frame 128. For instance, the frame 134 explains that the paint application is being simulated on the smartphone 106, and provides controls 136a-c that can be used to simulate input that may not be available on the laptop 102. For instance, the control 136a corresponds to shaking input, such as shaking the smartphone 106. In another example, the control 136b can provide rotational input that would be detected by one or more gyroscope sensors within the smartphone 106. In a further example, the control 136c can provide movement input that may be detected by various sensors within the smartphone 106, such as by accelerometers and/or global positioning system (GPS) sensors. The user can interact with these controls 136a-c in a variety of ways. For example, the controls 136a-c can be buttons a user presses to perform the associated action. In another example, the controls 136a-c can be switches that are toggled on and off. When one or more of the controls are toggled "on," the user may provide the associated input by manipulating a 2D/3D model 138 of the smartphone 106.

The example frame 134 also provides a user with the ability to simulate the paint application on other computing devices associated with User A. For instance, the example list 140 of other computing devices includes User A's tablet computing device and User A's desktop computing device. Selection of one of these options could cause the computer server system 104 to instantiate another virtual machine for the selected device and to launch the paint application 126 on that virtual machine.

The preview of the paint application can also be provided to the user with a feature 142 through which the user can purchase the previewed application. In this example, the feature 142 is a button that the user can select to purchase the paint application. Purchasing the paint application can cause the paint application to be added to the application repository 108c as being associated with the User A's account, and can be provided to the smartphone 106, the laptop computer 102, and/or other computing devices associated with User A. As explained in greater detail with regard to FIG. 2B, the native paint application may be provided to devices that are compatible with the paint application (e.g., devices that are able to run the paint application as purchased) and/or other versions of the paint application (e.g., a tablet version of the paint application) whereas thin clients (and/or thin client configuration information) for the paint application may be provided to non-compatible devices.

In some implementations, the computer server system 104 may cause the device that is requested for simulation to perform the requested operations and to communicate with the requesting device instead of using a virtual machine, as indicated by action box C (144). For example, if the laptop computer 102 were to provide a request to the computer server system 104 for access to an application that is already installed on the smartphone 106, the computer server system 104 may respond by initiating communication between the smartphone 106 and the laptop 102 so as to cause the smartphone 106 to interact with a thin client on the laptop 102 to provide the requested access.

Although FIG. 1 is described above with regard to user accounts, the system 100 can be used without user accounts as well. For example, a user of the laptop computer 102 can provide a request to the computer server system 104 for access to an application (e.g., the paint application 126). In response, the computer server system 104 can identify virtual hardware (e.g., the virtual smartphone hardware 122) and/or an operating system (e.g., the smartphone OS 124) to use for a virtual machine (e.g., the virtual machine 116), instantiate the virtual machine, and run the requested application (e.g., the pain application 126) using the instantiated virtual machine so as to provide the user of the laptop computer 102 with access to the application.

Such virtual hardware and/or operating system information can be identified without user account information by the server system 104 in a variety of ways. For example, the computer server system 104 can simulate the computing device that is requesting access to an application, which in the present example is the laptop computer 202. The computer server system 104 can obtain information from the laptop computer 202 regarding the hardware and/or operating system that are used by the laptop computer 202. For instance, the computer server system 104 can provide the laptop computer 202 with code (e.g., JAVASCRIPT code) that, when executed by the laptop computer 202 (and possibly with the permission/consent of the user), cause the laptop computer 202 to collect information (e.g., manufacturer information, model number, operating system type, version information) identifying various hardware and/or software components and to provide the collected information to the server system 104.

In another example, the server system 104 can simulate other computing devices, such as the smartphone 106. Without using user account information, the server system 104 can identify other devices in a variety of ways. For instance, the server system 104 can identify other devices that are connected to the laptop computer 102 through wired connections (e.g., universal serial bus (USB) connection) and/or wireless connection (e.g., near field wireless communication connections, such as a BLUETOOTH wireless connection). The laptop computer 102 can execute code (previously installed on the laptop computer 102 and/or provided by the server system 104) to identify other devices connected to the laptop computer 102, and to provide such information regarding hardware and/or software (e.g., operating system) for such other devices to the server system 104.

In another example, the server system 104 can provide a user of the laptop computer 102 with information that can be used to uniquely identify one or more other devices to the server system 104 over a network (e.g., Internet, wireless network). For instance, the server system 104 can provide a uniform resource locator (URL) that the user can enter into an application (e.g., a web browser application) of a device, such as the smartphone 106, so as to connect and uniquely identify the device to the server system 104. For example, the server system 104 can provide the URL "example.com/12345" to the laptop computer 102 and instruct the user to enter the URL into the web browser of a device he/she would like to simulate. In conjunction with providing the URL to the laptop computer 102, the server system 104 can associate the URL with the laptop computer 102 (e.g., store information associating the URL with the laptop computer 102) so that, when a request using the URL is received, the requesting device can be identified as the device intended by the user to be simulated. The user can enter the URL ("example.com/12345") into a web browser of another device (e.g., the smartphone 106), which can cause the other device to send a request for the URL to the server system 104 (or some other system associated with the server system 104). Upon receiving a notification that a device (e.g., the smartphone 106) is attempting to connect to the URL, the server system 104 can provide code (e.g., JAVASCRIPT) to the other device that, when executed by the other device, will cause the other device to provide information regarding hardware and/or an operating system used by the other device to the server system 104. With the hardware and/or operating system information obtained for the other device (e.g., the smartphone 106), the server system 104 can instantiate a virtual machine for the other device, launch the requested application using the virtual machine, and provide an indication to the laptop computer 102 that the simulation of the requested application running on the other device is available.

In another example, the server system 104 can query a user of the laptop computer 102 for information identifying hardware and/or an operating system that should be used for the simulation. Such querying can involve providing the user with menus of various computing device (e.g., list of smartphones, list of tablet computing device, list of laptop computers) and/or operating systems (e.g., mobile operating systems, tablet operating systems, desktop operating systems) from which the user can select a computing device for the server system 104 to simulate. Such menus may also be restricted to including computing devices and/or operating systems upon which a requested application is configured to be run. Such menus may also include and/or highlight options for computing devices that are new and/or not yet released to the public. For example, users may be able to simulate a new smartphone that has not yet been made publicly available, but for which the server system 104 has a virtual machine in advance of the smartphone's release. Upon receiving selection of one or more devices, the server system 104 can instantiate virtual machines for the selected devices and provide the client computing device 102 with access to the selected devices and/or applications running on the selected devices using the instantiated virtual machines.

Figure 2A:
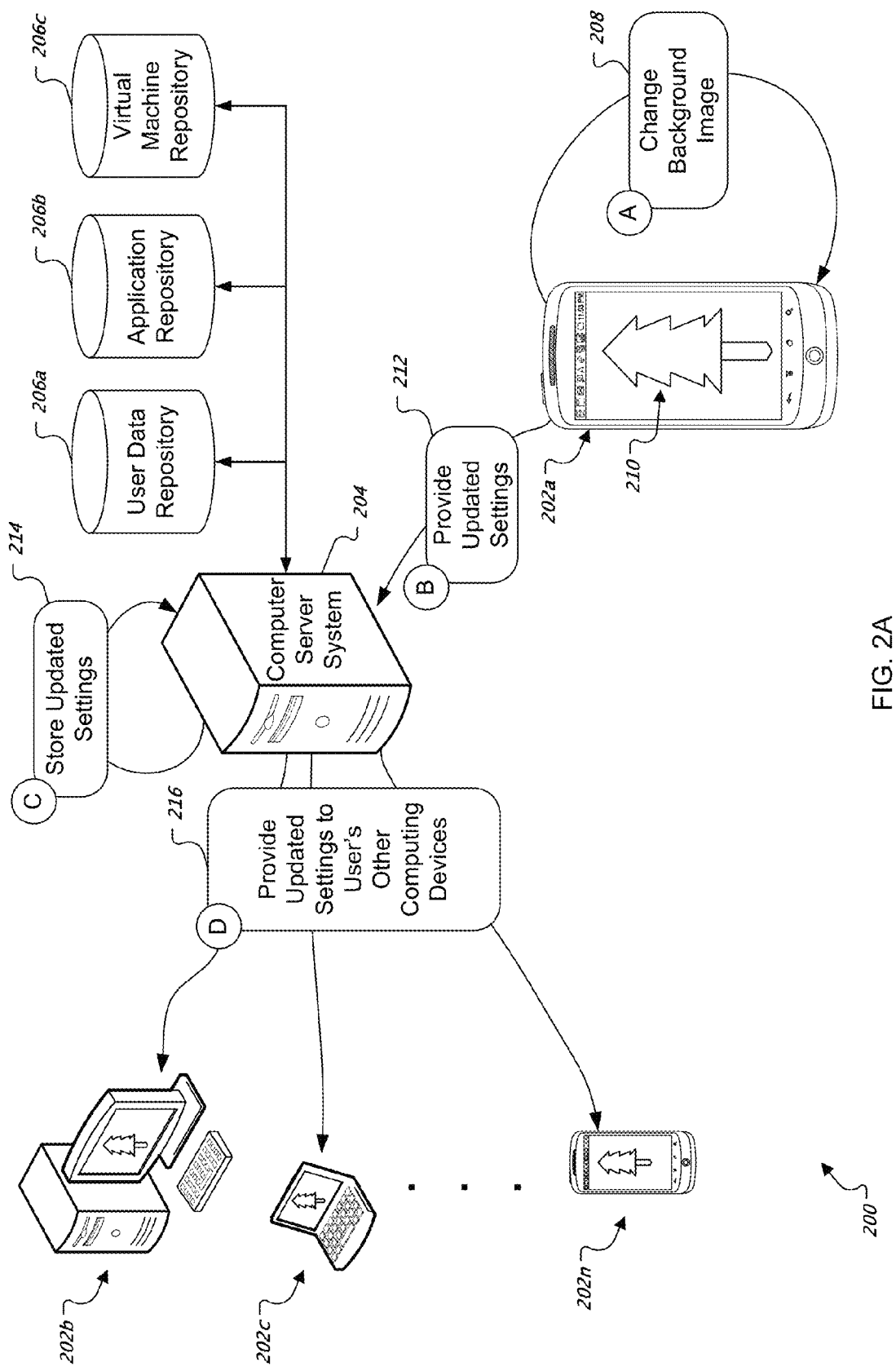
FIGS. 2A-B are diagrams of systems for propagation of device changes.
Figure 2B:
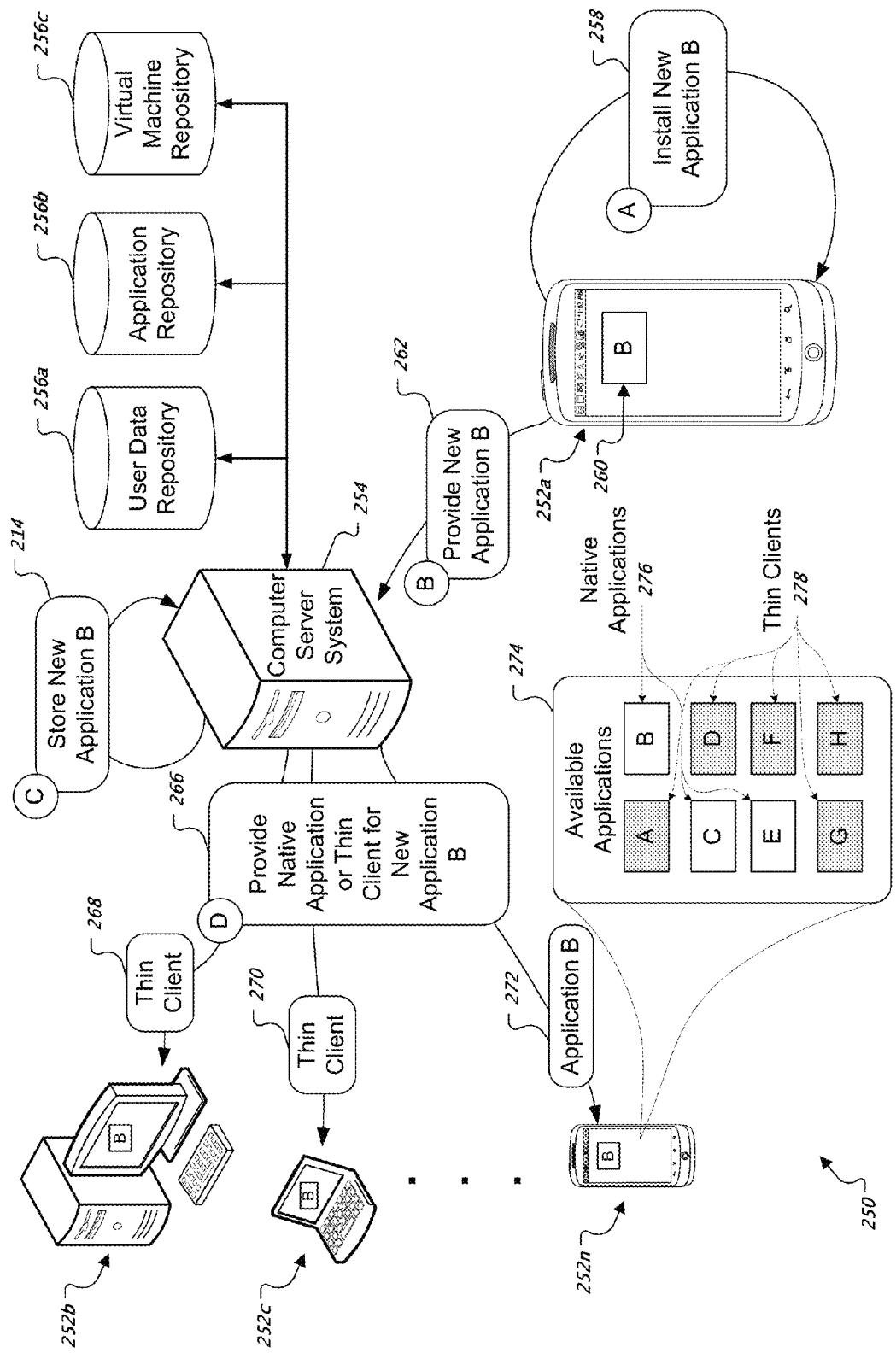

FIGS. 2A-B are diagrams of systems 200 and 250 for propagation of device changes.

Referring to FIG. 2A, a user is associated with devices 202a-n and a change associated with the device 202a is propagated to the other devices 202b-n though a computer server system 204. The computing devices 202a-n can be any of a variety of computing devices, such as smartphones (202a, 202n), desktop computers (202b), laptop computers (202c), netbooks, PDAs, and/or tablet computing devices. The computing devices 202a-n can be similar to the computing devices 102 and/or 106 described above with regard to FIG. 1.

The computer server system 204 can manage various device settings associated with user accounts and can push changes among devices associated with user accounts so as to maintain consistency among a user's devices. The computer server system 204 can be any of a variety of computer server systems, such as a distributed server system. The computer server system 204 can be similar to the computer server system 104 described above with regard to FIG. 1. The computer server system 204 can use various repositories to perform its setting management operations, such as the repositories 206a-c. The repositories 206a-c can be similar to the repositories 108a-c described above with regard to FIG. 1.

An example setting is changed on device 202a, as indicated by action box A (208). For instance, the background image of the device 202a is changed to an image of a tree 210.

In response to the setting (background image) being changed, the device 202a can provide an indication to the computer server system 204 that a setting has been changed, as indicated by action box B (212). The indication provided to the computer server system 204 can include information identifying the computing device 202a and/or the user account with which the device 202a is associated. The device 202a can include a process (e.g., an operating system-level process) that monitors for setting changes on the device 202a and reports those changes to the computer server system 204. To protect user privacy, a user may have to provide permission for such a process to be run on the device 202a and/or for information to be transmitted to the server 204. A user can always opt-out of such a process being run and information being provided to the computer server system 204.

Upon receiving the updated settings, the computer server system 204 can store the updated settings in one or more of the repositories 206a-c, as indicated by action box C (214). For example, the computer server system 204 can store the background image 210 in the user data repository 206a in association with the user account. The computer server system 204 can also identify one or more other computing devices that are associated with the user account. The user account may specify various settings that are to be global across some or all of her devices and various settings that are to be local to each device. For instance, a user may want each device to have the same list of contacts, but may not want each device to have the same background image. Additionally, some settings may not be applicable to certain computing devices. For instance, some devices may not have background images that can be set and/or changed by a user.

Using account and/or device information associated with the user of the computing device 202a, the computer server system 204 can identify other computing devices for the user that should be receive the settings updated on the computing device 202a. In this example, the updated settings are provided to all of the users other computing devices 202b-n, as indicated by action box D (216). The computer sever system 204 can attempt to locate each of these devices to push the updated settings out. In some implementations, the computer server system 204 may queue setting updates for a device until the device subsequently contacts the computer server system 204, and then provide the updates to the device at that point. As depicted in the example system 200, each of the devices 202b-n has the image 210 of the tree set as its background image.

FIG. 2B depicts the example system 250 in which a user is associated with devices 252a-n, a new application B is installed on the device 252a, and the new application B is propagated to the other devices 252b-n though a computer server system 254. The computing devices 252a-n can be any of a variety of computing devices, such as smartphones (252a, 252n), desktop computers (252b), laptop computers (252c), netbooks, PDAs, and/or tablet computing devices. The computing devices 252a-n can be similar to the computing devices 102 and/or 106 described above with regard to FIG. 1, and/or the computing devices 202a-n described above with regard to FIG. 2A.

The computer server system 254 can manage various device settings associated with user accounts, such as application installations, and can push changes among devices associated with user accounts so as to maintain consistency among a user's devices. The computer server system 254 can be any of a variety of computer server systems, such as a distributed server system. The computer server system 254 can be similar to the computer server system 104 described above with regard to FIG. 1, and/or the computer server system 204 described above with regard to FIG. 2A. The computer server system 254 can use various repositories to perform its setting management operations, such as the repositories 256a-c. The repositories 256a-c can be similar to the repositories 108a-c described above with regard to FIG. 1, and/or the repositories 206a-c described above with regard to FIG. 2A.

As indicated by action box A (258), a new application B is installed on the computing device 252a. An icon 260 for the application B is depicted as being presented on the device 252a.

In response to the application B being installed, the computing device 252a can provide an indication that the new application B has been installed to the computer server system 254, as indicated by action box B (262). In addition to providing the indication to the computer server system 254, the computing device 252a can provide a copy of the application B to the computer server system 254. For instance, in response to receiving the indication from the computing device 252a, the computer server system 254 may check the application repository 256b to determine whether a copy of the application B is present. If the application B is not present in the repository 256b, then the computer server system 254 can request a copy from the computing device 252a. In some implementations, computer server system 254 can maintain copies of applications for each user account and can request a copy of the application B from the computing device 252a. In some implementations, the computer server system 254 maintains a single copy of each version of each application which can be retrieved for users based on records that indicate which applications and/or application versions users are authorized to use.

In response to receiving the indication and/or the application, the computer server system 254 can store information indicating that the application B has been installed on the device 252a (and/or the application B) in one or more of the repositories 256a-c, as indicated by action box C (264). For example, the computer server system 254 can store information associated with the user account in the user data repository 256a indicating that the user has authorization and/or a license to use application B. In another example, the computer server system 254 can store the application B, as installed on the device 252a, in the application repository 256b as being owned in association with the user account.

The computer servers system 254 can identify which of the other computing devices 252b-n associated with the user account are able to run the application B in its native form (e.g., as an executable installed on the device 252a). Devices that are unable to run the native application B, can access the application B through a virtual machine running on the computer server system 254 (and/or through direct communication with the device 252a), similar to the techniques described above with regard to FIG. 1. Such a virtual machine may be instantiated to simulate the computing device 252a, from which the application B was obtained. The devices that are unable to run the application B in its native form can be provided with thin clients (and/or configuration information for thin clients) that are used to interact with the virtual machine running application B on the computer server system 254.

As indicated by action box D (266), the computing devices 252b-c are provided with the thin clients (and/or thin client configuration information) 268-270 and the computing device 252n is provided with the native application 272. Thin client configuration information can include information to communicate with the computer server system 254 with regard to application B, such as a uniform resource locator (URL) for the virtual machine service provided by the computer server system 254, an identifier for the user account associated with the computing devices 252a-n, and/or an identifier associated with application B. A single thin client application on the computing devices 252a-n can use such configuration information to provide access to a plurality of applications run on the computer server system 254 using virtual machines. Thin client configuration information can be used to generate menu entries and/or application icons that link to one or more thin client applications on the computing devices 252a-n using the configuration information such that, when the menu entry or icon is selected, one or more of the thin client applications are launched with the configuration information. Such menu entries and/or application icons may have the same appearance as menu entries and/or icons for natively installed applications. Native applications, such as the native application 272, can be installed directly on the devices 252a-n.

Computing devices 252a-n can end-up with a collection of native application and thin client enabled applications. For instance, an example display 274 of available applications on the computing device 252n is presented. Icons for applications B, C, and E correspond to native applications 276 that are installed and run locally on the computing device 252n. Icons for applications A, D, F, G, and H correspond to applications 278 that can be run on the computing device 252n though the assistance of one or more thin client applications on the computing device 252n and through interaction with one or more virtual machines running on the computer server system 254. Selecting one of the icons for applications 278 can cause interaction between the computing device 252n and the computer server system 254, similar to the interaction between the laptop computing device 102 and the computer server system 104 described above with regard to FIG. 1. The icons presented in the example display 274 can be displayed similarly such that a difference between native application and thin client-enabled applications is not readily apparent to a user.

FIG. 3 depicts an example system 300 for providing application previews and/or device synchronization using a computer server system 302. The computer server system can be or include any of a variety of computing systems, such as a distributed server system, and can be similar to the computer server systems 104, 204, and/or 254 described above with regard to FIGS. 1, 2A, and 2B, respectively.

The computer server system 302 can provide application previews and/or device synchronization to client computing devices 304a-n and 306a-n over network 310. The client computing devices 304a-n and 306a-n can be similar to the computing devices 102 and 106 described above with regard to FIG. 1, and/or the computing devices 202a-n and/or 252a-n described above with regard to FIGS. 2A and 2B, respectively. The network 310 can be any of a variety of networks, such as the Internet, 3G/4G networks, wireless networks, fiber optic networks, LANs, WANs, VPNs, and/or any combination thereof.

The computer server system 302 can include one or more I/O interfaces 312 that are configured to communicate with the client computing devices 304a-n and 306a-n over the network 310. For example, the I/O interfaces 312 can include Ethernet ports, wireless transceivers, and/or fiber optic ports.

The computer server system 302 can include a synchronization manager 314 that determines whether devices associated with a user account are out of sync, determines whether the user has requested that the devices be synced with regard to the out of sync setting, and proceeds with synchronizing devices with regard to such setting. For example, the synchronization manager 314 can perform synchronization among devices associated with a user account with regard to out of sync settings, as described in FIGS. 2A-B. The synchronization manager 314 can use various repositories to synchronize computing device associated with a user account, such as the repositories 315a-c. The repositories 315a-c are similar to the repositories 108a-c, 206a-c, and/or 256a-c described above with regard to FIGS. 1, 2A, and 2B, respectively.

A virtual machine management module 316 can manage the deployment of virtual machines to provide application previews and to provide access to applications that are associated with a user account but not natively installed on a particular associated computing device. The virtual machine management module 316 can instantiate virtual machines to simulate specified computing devices (e.g., the smartphone 106 described with regard to FIG. 1) and/or to simulate computing devices that are capable of executing a particular application (e.g., the computing device 252a that is configured to execute the application B, as described with regard to FIG. 2B). The virtual machine management module 316 can instantiate and manage virtual machines as described above with regard to FIGS. 1 and 2B. The virtual machine management module 316 can use information contained in the virtual machine repository 315c to configure virtual hardware and virtual operating systems to simulate various computing devices.

An application management module 318 can manage access to applications in conjunction with user accounts. For instance, the application management module 318 can determine whether a user is permitted to access a particular application in preview mode or in full-access mode (e.g., user purchased the application). The application management module 318 can rely, at least in part, on user account information stored in the repositories 315a-c to make such determinations. The application management module 318 can include an application store 320 and/or a licensing module 322. The application store 320 can manage user interactions with regard to purchasing applications (e.g., purchasing application licenses). The licensing module 322 can manage concurrent use of purchased applications/licenses to ensure that users maintain compliance with licenses that they own. For example, a user may purchase a single license of a particular application. The licensing module 322 can allow a first computing device associated with the user to access the application, but may restrict a second computing device associated with the user from concurrently accessing the application based on the user owning only one license for the application. Similarly, some licenses may expire after a period of time (e.g., license good for six months, one year). The licensing module 322 can manage and alert a user as the expiration of application licenses.

A device I/O translator 324 can be used by the computer server system 302 to translate input and output from one device to another device. For example, referring to FIG. 1, the paint application provided in frame 128 on the laptop computer 102 may natively use touch-based input based on the application being simulated on the smartphone 106 (which may include a touchscreen). However, the laptop computer 102 may not have a mechanism to receive touch-based input, but instead may use a trackball or other pointing device. The device I/O translator 324 can translate trackball input from the laptop computer 102 into touch-based input on the smartphone 106. Various I/O mappings between input and output devices can be used by the device I/O translator 324 to perform such translations.

A device I/O simulator 326 can simulate input and/or output that is available on a computing device but that may not available on another computing device. For example, a smartphone can include various sensors that allow types of input, such as motion and geographic location-based input, that may not be available on other computing devices. For instance, a smartphone can receive motion and location-based input using sensors such as accelerometers, gyroscopes, GPS units, and/or capacitive touch sensors. The device I/O simulator 326 can generate controls to simulate types of input that are available on a computing device that is being simulated by a virtual machine, but which may not be available on a computing device that is providing an interface for the virtual machine or that may not be available through the interface. For instance, the device I/O simulator 326 can provide the controls 136a-c and the device model 138 so as to simulate various inputs that are available on the simulated smartphone 106, but that are not available on the laptop computer 102 from which the input for the paint application is obtained, as described above with regard to FIG. 1.

Users interacting with the computer server system 302 can each have one or more associated computing devices. For instance, User A is associated with computing devices 304a-n and User B is associated with computing devices 306a-n. The computing device 304a is depicted as including an I/O interface 328, a synchronization module 330, and a thin client application 332. The I/O interface 328 can send and receive input and output for the device 304a over, at least, the network 310. The synchronization module 330 can synchronize the device 304a by interacting with the computer server system 302 and, in particular, the synchronization manager 314. The synchronization module 330 can notify the synchronization manager 314 when settings on the device 304a have changed, and can update settings on the device 304a when instructed by the synchronization manager 314. The thin client application 332 can interact with virtual machines running on the computer server system 302 to provide remotely executed applications on the computing device 304a. The thin client application 332 can use thin client configuration information from the thin client data repository 334, which can store information used to connect with the computer server system 302 to provide various applications on the device 304a. The synchronization module 330 can use the application repository 336 to store applications that have been provided to the device 304a as part of a synchronization process, and/or to other applications natively installed on the device 304a. The devices 304b-n and/or 306a-n can be similar to the device 304a.

Figure 4:
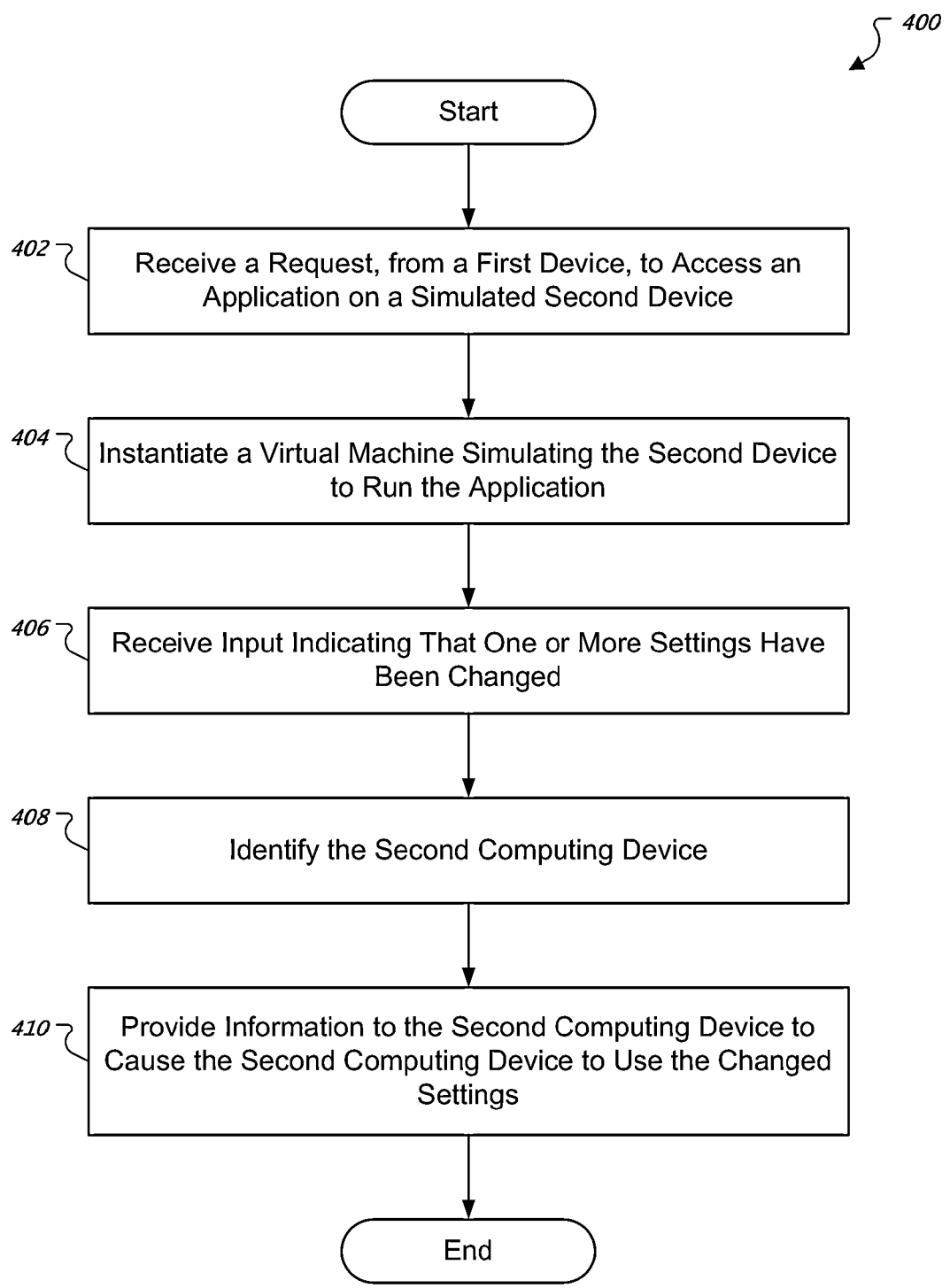
FIG. 4 is a flowchart of an example technique for providing an application preview and/or computing device synchronization.

FIG. 4 is a flowchart of an example technique 400 for providing an application preview and/or computing device synchronization. The technique 400 can be performed by any of a variety of computing devices, such as the computer server system 104 described with regard to FIG. 1, the computer server system 204 described with regard to FIG. 2A, the computer server system 254 described with regard to FIG. 2B, and/or the computer server system 302 described with regard to FIG. 3.

At 402, a request is received from a first computing device to access an application using a simulation of a second computing device. For example, the laptop computer 102 provides a request to access the paint application using a simulation of the smartphone 106, as described with regard to FIG. 1. Such a request can be to use an application that is for sale as the application would operate on the second computing device. Such a request can also be to preview a new computing device that has not yet been made available to the public.

At 404, a virtual machine simulating the second computing device is instantiated to run the application. For example, the computer server system 104 instantiates the virtual machine 116, which simulates the virtual hardware 122 and the operating system 124 of the smartphone 106 to run the paint application 126. The virtual machine can be instantiated using settings from an account associated with the first computing device and/or a user of the first computing device, such as device configurations, installed applications, and/or user data. The virtual machine can also be instantiated to include controls that will simulate types of input on the second computing device that may not be available on the first computing device and/or that may not be available through an interface for the virtual machine. For example, the device I/O simulator 326 can generate controls (e.g., the controls 136a-c) to simulate movement-based input, such as shaking and/or titling a computing device. The virtual machine can also be instantiated to include a feature whereby a user can purchase the application and cause the application to be pushed to the first computing device and/or other computing devices associated with the user.

At 406, input is received from the first computing device indicating that one or more setting have been changed. For example, User A can select the purchase button 142 to buy the paint application, which changes the settings for User A's account to include the paint application as having been purchased. In another example, the background image 210 can be changed on the first computing device, which can cause the new background image to be pushed out to other computing devices associated with the computing devices 202b-n.

At 408, the second computing device is identified. For example, the smartphone 106 can be identified/located by the computer server system 104 in response to the paint application having been purchased during the preview on the laptop computer 102. Such a second computing device can be one of multiple computing devices that are registered and/or associated with an account for the user.

At 410, information is provided to the second computing device to cause it to use the changed settings. For example, in response to the paint application having been purchased during the preview, the paint application can be provided to the smartphone 106, which can cause the smartphone 106 to install the paint application. The information can push new settings to other computing devices associated with a user of the first computing device, such as newly installed applications, new device configurations (e.g., wireless network settings, updated contacts), and/or new user data (e.g., updated list of documents contained within a particular folder).

Figure 5A:
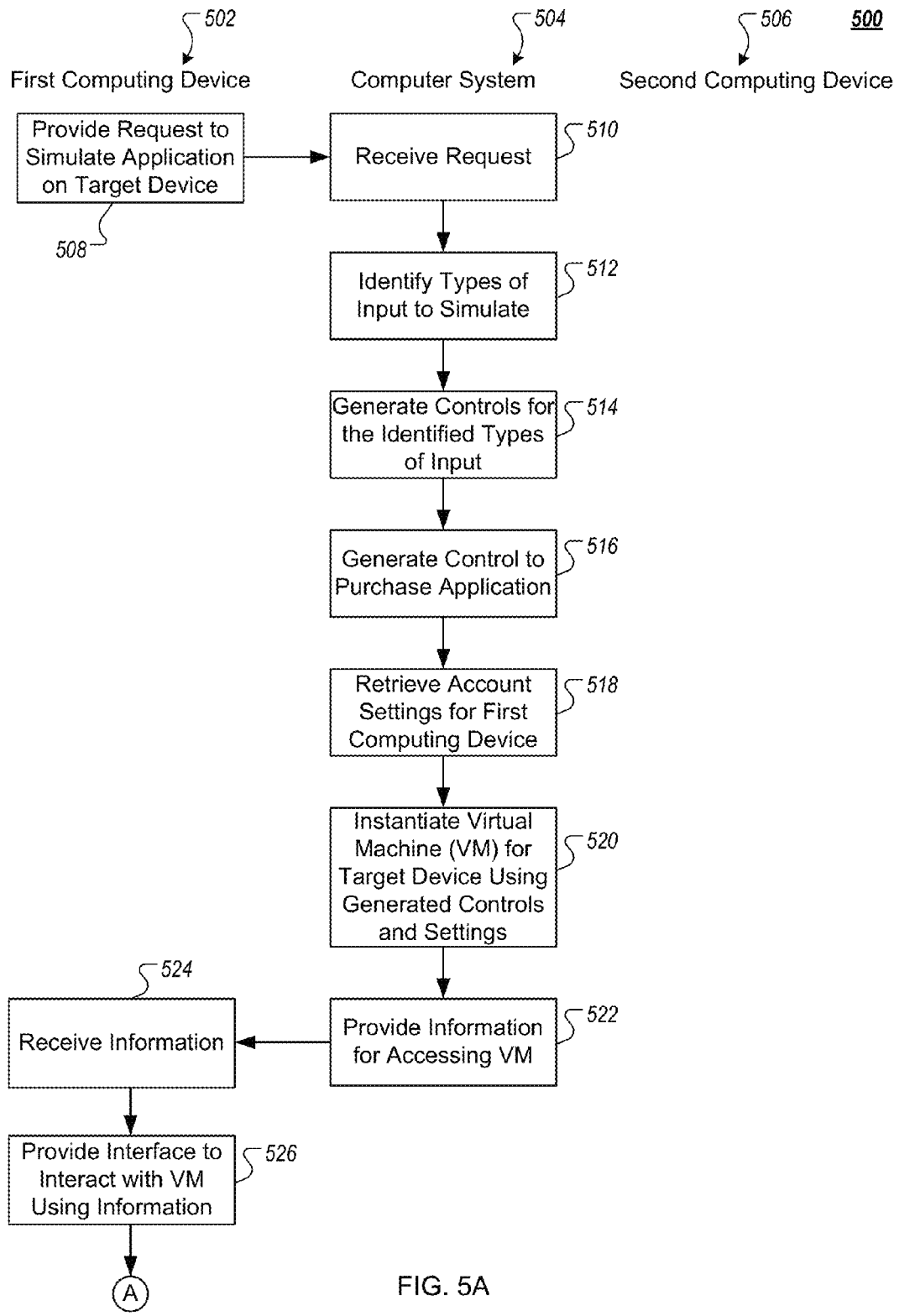
FIGS. 5A-B are flowcharts that depict an example technique for providing access on a first computing device to a simulation of an application running on a target computing device.
Figure 5B:
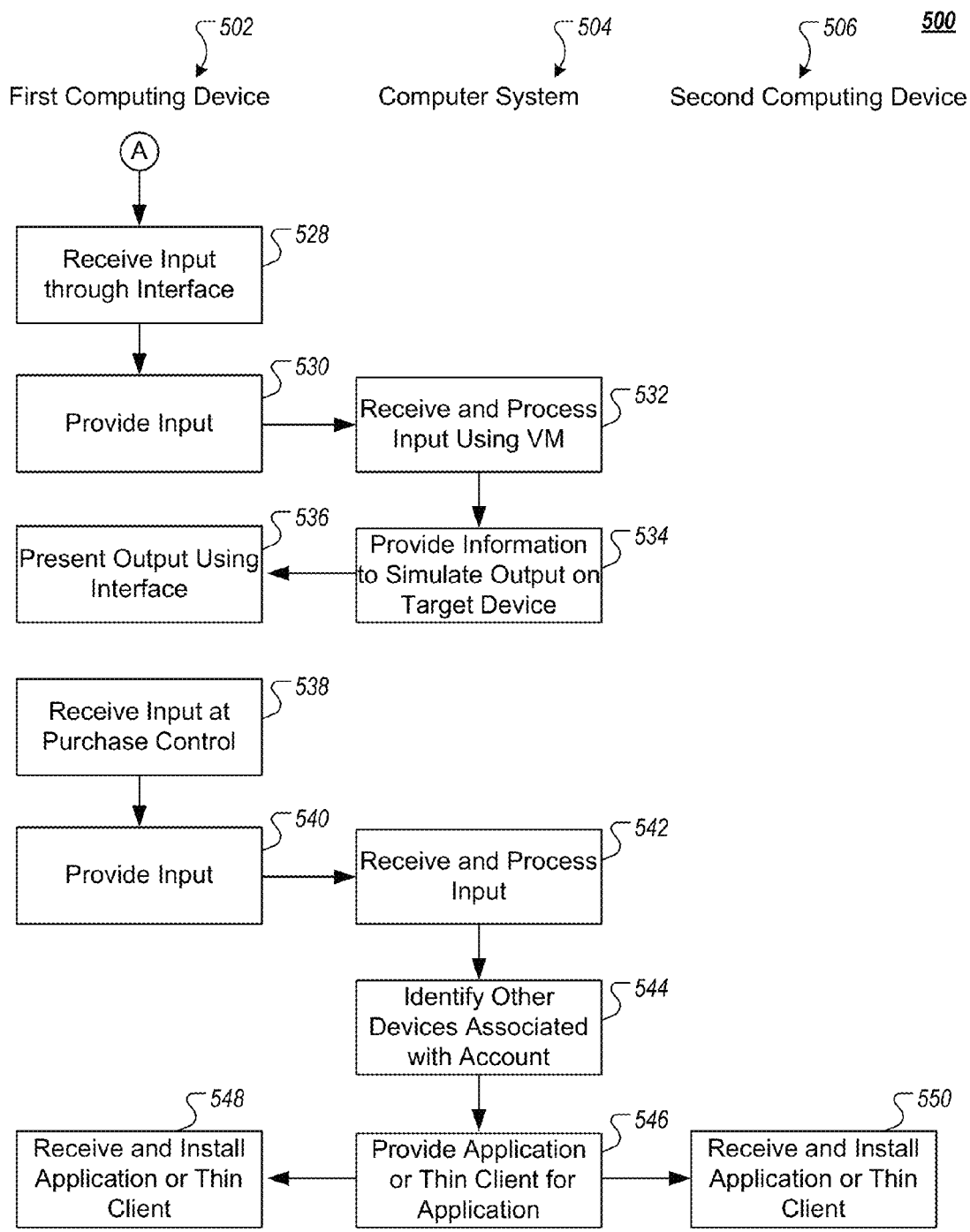

FIGS. 5A-B are flowcharts that depict an example technique 500 for providing access on a first computing device 502 to a simulation of an application running on a target computing device. The example technique 500 is depicted as being performed in-part by the first computing device 502, a computer system 504, and a second computing device 506. The first computing device 502 can be any of a variety of appropriate computing device, such as the laptop computer 102, the computing device 202a, the computing device 252a, and/or the client computing device 304a. The computer system 504 can be any of a variety of appropriate computer system, such as the computer server system 104, the computer server system 204, the computer system 254, and/or the computer server system 302. The second computing device 506 can be any of a variety of appropriate computing device, such as the smartphone 106, the computing devices 202b-n, the computing devices 252b-n, the client computing device 304n, and/or the client computing devices 306a-n.

Referring to FIG. 5A, a request can be provided by the first computing device 502 to the computer system 504 to provide access to a simulation of an application running on the target computing device (508). For example, the client computing device 304a can provide a request to the computer system 302 to access a simulation of the client computing device 304n running one or more applications. In some implementations, the request can be to access a simulation of the target computing device.

The target computing device can be any of a variety of appropriate computing devices. For instance, the target computing device can be another computing device that is associated with a user of the first computing device 502. For example, the target computing device can be the smartphone 106 and the first computing device 502 can be the laptop computer 102, as described above with regard to FIG. 1. In another example, the target computing device can be a computing device that is not associated with a user of the first computing device 502. For instance, the target computing device can be a computing device that a user of the first computing device 502 wants to try out before purchasing. For example, the target computing device can be a computing device that is has not yet been publicly released—the simulation can provide the user of the first computing device 502 with an opportunity to try the target computing device before purchasing The computer system 504 receives the request (510) and identifies one or more types of input that are available on the target computing device but which may either not be available on the first computing device 502 or may not be provided in an interface through which a simulation of the target computing device is provided (512). Such identified types of input can vary depending on a variety of factors, such as differences between inputs received and/or sensors available on the first computing device 502 and/or the target computing device. For example, identified types of input can include motion-based input (e.g., shaking, tilting, rotating a device) that may be detected by motion sensors such as accelerometers and/or gyroscopes. In another example, identified types of input can include location-based input received through a GPS unit and/or touch-based input received through touch sensors (e.g., capacitive touch sensors).

Controls can be generated for the identified types of input (514). Such controls can provide a mechanism for simulating the identified types of input in an interface simulating the target computing device as it is running on the first computing device 502. For example, example controls 136*a-c* can be generated for simulation of types of motion-based input that are available on the smartphone 106 but which are not available on the laptop computer 102.

One or more controls to purchase the application that is being simulated as running on the target computing device can be generated (516). For example, a purchase feature 142 can be generated so as to allow a user previewing the application to readily purchase it for use on the first computing device 502 or another computing device, such as the target computing device and/or the second computing device 506.

Account settings for the first computing device 502 and/or a user associated with the first computing device 502 can be retrieved (518) and can be used, along with the generated controls, to instantiate a virtual machine of the target device (520). Account settings can include a variety device-related settings, such as installed and purchased applications and/or data (e.g., contacts, emails, text messages). For example, the computer server system 104 can instantiate the virtual machine 116 that simulates the paint application 126 running on the virtual smartphone hardware 122 and OS 124 using information from the repositories 108*a-c*.

Information for accessing the instantiated virtual machine can be provided by the computer system 504 (522) and can be received by the first computing device 502 (524). For example, the computer system 504 can send information to install and/or configure a thin client on the first computing device 502 to interact with a virtual machine running on the computer system 504 so as to provide a simulation of the target computing device on the first computing device 502. The first computing device 502 use the received information to provide an interface through which a user can interact with the simulation of the target computing device that is running the application (526). For example, the frame 128 and the frame 134 can be provided for a user to interact with the simulation of a target computing device (the virtual machine 116) running on the computer server system 104.

Referring to FIG. 5B, input can received through the provided interface (528) and can be provided by the first computing device 502 to the computer system 504 (530). For example, the first computing device can receive user input provided into the frame 128, such as a pointer selection and/or text entry, and/or provided into the frame 134 (e.g., selection of one or more of the controls 136*a-c*). The input can be provided by the first computing device 502 using a variety of techniques, such as providing encoded event information to the computer system 504. The computer system 504 can receive and process the received input using the virtual machine (532) and can provide information to the first computing device 502 that simulates output that the target device would generate in response to such input (534). The computing device 502 can present the output on the computing device 102 using the interface through which the input was received. For example, user input received through the frame 128 can be provided by the laptop computer 102 to the computer server system 104 and subsequently provided to the virtual machine 116. Using the instantiated paint application 126, smartphone OS 124, and/or virtual smartphone hardware 122, the input can be processed and responsive output can be generated (e.g., updated display information). Such output can be provided to laptop computer 102 over the network 107 and can be used to update the information displayed in the frame 128.

In one example, a user can select one or more of the generated controls 136*a-c*. Information indicating the selection can be provided by the laptop computer 102 to the computer server system 104, which can provide the information to the virtual machine 116. The virtual machine 116 can simulate the type of input associated with the selected controls 136*a-c* and can generate output based on simulated input, as it would be processed by the paint application running on the smartphone 106. Such output can be provided by the computer server system 104 to the laptop computer 102, and the corresponding interfaces provided in frames 128 and 134 can be updated accordingly.

Input can also be received in response to a user of the first computing device 502 selecting a purchase control, which can indicate that the user wants to purchase an application that is being simulated on the target computing device (and/or to purchase the target computing device) (538). The received purchase input can be provided by the first computing device 502 (540), and received and processed by to the computer system 504 (542). For example, a user can select the purchase feature 142 to purchase the paint application. An indication that the user wants to purchase the paint application along with payment information (e.g., user account identifier, credit card information) can be provided by the laptop computer 102 to the computer server system 104, which can process the payment information.

The computer server system 504 can identify other computing devices that are associated with an account for the first computing device 502 and/or a user associated with the first computing device 502 (544) and can provide the application and/or a thin client for the application to the identified devices (and/or including the first computing device 502) (546). For example, the computer server system 504 can identify that the second computing device 506 is associated with an account for the first computing device 502 and/or a user associated with the first computing device 502, and can provide the application/thin client to the second computing device 506 as well as to the first computing device 502. The application and/or thin client can be received and installed by the first computing device 502 (548) and the second computing device 506 (550).

Figure 6:
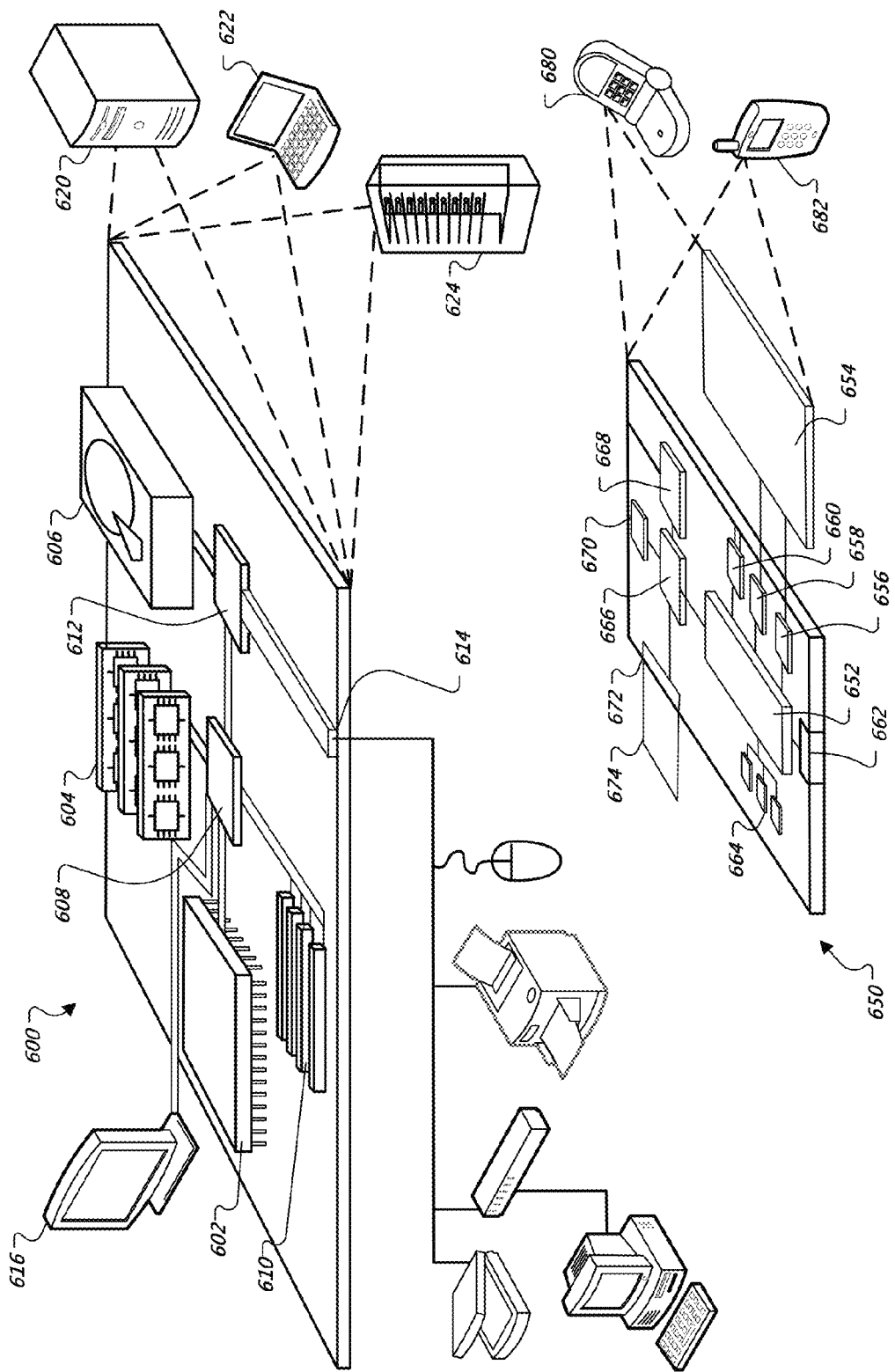
FIG. 6 is a block diagram of computing devices.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a tangible and non-transitory computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing application previews and/or device synchronizations may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:

receiving, at a computer system operating an application marketplace and from a first computing device of a first type of computing device, a request to access on the first computing device a simulation of an executing application, wherein the request is made at a section of the application marketplace that offers the application for download;

identifying, by the computer system, one or more types of input that are available on a second type of computing device that is determined to be a type of device on which the application is designed to execute, and that are not available on the first computing device;

executing the application as a simulation that matches how the application would execute on the second type of computing device, using a virtual machine of the computer system that is configured to provide input received through controls that are not available with the first computing device but that are generated to be displayed on the first computing device to simulate input on the second type of computing device;

providing information to the first computing device that causes i) an interface for the application as executed by the virtual machine to be presented by the first computing device and ii) the generated controls to be presented by the first computing device in association with the interface; and in response to a user selection from the first computing device to acquire the application, making the application available for download from the computer system to a second computing device of the second type of computing device, wherein the second computing device is determined to correspond to a user of the first computing device and is different in type than the first computing device.

2. The computer-implemented method of claim 1, wherein the application is offered for sale by the computer system, and execution of the application on the virtual machine provides the first computing device with a preview of the application running on the second computing device.

3. The computer-implemented method of claim 2, wherein the information provided to the first computing device further causes a selectable option to purchase the application to be presented on the first computing device, and wherein selection of the option causes the application to be made available for download on multiple computing devices determined to correspond to the user of the first computing device.

4. The computer-implemented method of claim 3, further comprising:
receiving input from the first computing device indicating that a user of the first computing device has selected the option to purchase the application;
in response to receiving the input, determining whether the user is associated with the second computing device of a type of device that is being simulated by the instantiated virtual machine; and
providing the application to the second computing device as a download of executable code to the second computing device.

5. The computer-implemented method of claim 1, wherein the first computing device comprises a desktop computer or a laptop computer, and wherein the second computing device comprises a tablet computing device, a cellphone, a media player device, a personal digital assistant, or a smartphone.

6. The computer-implemented method of claim 1, wherein the information provided to the first computing device comprises configuration information for a thin client running on the first computing device to i) use to connect and interact with the application being executed by the virtual machine on the computer system and ii) to present the generated controls.

7. The computer-implemented method of claim 1, wherein at least one of the identified types of input that is simulated by the generated controls comprises movement-based input that is received by one or more sensors of a computing device that detect physical movement of the computing device.

8. The computer-implemented method of claim 7, wherein at least one of the generated controls simulates physical movement of the computing device as detected by one or more accelerometers that measure acceleration of the computing device.

9. The computer-implemented method of claim 7, wherein at least one of the generated controls simulates physical movement of the computing device as detected by one or more gyroscopes that measure rotation of the computing device.

10. The computer-implemented method of claim 1, wherein at least one of the identified types of input that is simulated by the generated controls comprises geographic location-based input that is detected by a global positioning system (GPS) unit of the computing device.

11. The computer-implemented method of claim 1, wherein the second computing device is not yet publicly available and the virtual machine provides a preview of the second computing device.

12. A computer program product tangibly embodied on a non-transitory computer readable medium storing instructions that, when executed, cause a computer system to perform operations comprising:
receiving, at a computer system operating an application marketplace and from a first computing device of a first type of computing device, a request to access a simulation of an executing application, wherein the request is made at a section of the application marketplace that offers the application for download;
identifying one or more types of input that are available on a second type of computing device that is determined to be a type of device in which the application is designed to execute, and that are not available on the first computing device;
executing the application as a simulation that matches how the application would execute on the second type of computing device, using a virtual machine of the computer system that is configured to provide input received through controls that are not available with the first type of computing device but that are generated to be displayed on the first computing device to simulate input on the second type of computing device; and
providing information to the first computing device that causes i) an interface for the application as executed by the virtual machine to be presented by the first computing device and ii) the generated controls to be presented by the first computing device in association with the interface; and
in response to a user selection from the first computing device to acquire the application, making the application available for download from the computer system to a second computing device of the second type of computing device, wherein the second computing device is determined to correspond to a user of the first computing device and is different in type than the first computing device.

13. The computer program product of claim 12, wherein the application is offered for sale and execution of the application on the virtual machine provides the first computing device with a preview of the application.

14. The computer program product of claim 13, wherein the information provided to the first computing device further causes a selectable option to purchase the application to be presented on the first computing device.

15. The computer program product of claim 14, wherein the operations further comprise:
receiving input from the first computing device indicating that a user of the first computing device has selected the option to purchase the application;
in response to receiving the input, determining whether the user is associated with a physical device that corresponds to the second computing device that is being simulated by the instantiated virtual machine; and
providing the application to the physical device.

16. The computer program product of claim 12, wherein at least one of the identified types of input that is simulated by the generated controls comprises movement-based input that is received by one or more sensors of a computing device that detect physical movement of the computing device.

17. A system comprising:
one or more computers;

an interface of the one or more computers operating an application marketplace to receive, from a first computing device of a first type of computing device, a request to access a simulation of an application running on a second type of computing device;

a device input/output (I/O) simulator of the one or more computers provide simulated controls that are determined to be available on the second type of computing device but not the first type of computing device, so as to enable control of the application by the first computing device;

a virtual machine management module to instantiate a virtual machine arranged to simulate the second type of computing device executing the application, wherein the virtual machine is configured to provide input received through the generated controls to the application as input of the one or more identified types of input that are available on the second computing device, wherein the interface is further configured to provide information to the first computing device that causes i) an interface for the application as executed by the virtual machine to be presented by the first computing device and ii) the generated controls to be presented by the first computing device in association with the interface, and wherein, in response to a user selection from the first computing device to acquire the application, the application marketplace is arranged to make the application available for download to a second computing device of the second type of computing device, wherein the second computing device is determined to correspond to a user of the first computing device and is different in type than the first computing device.

18. The system of claim 17, further comprising an application management module to offer the application for sale;

wherein execution of the application on the virtual machine provides the first computing device with a preview of the application.

19. The system of claim 17, wherein at least one of the identified types of input that is simulated by the generated controls comprises movement-based input that is received by one or more sensors of a computing device that detect physical movement of the computing device.

20. The system of claim 17, wherein at least one of the identified types of input that is simulated by the generated controls comprises geographic location-based input that is detected by a GPS unit of the computing device.

* * * * *